United States Patent [19]

de Fontenay: Etienne et al.

[11] Patent Number: 4,854,562

[45] Date of Patent: Aug. 8, 1989

[54] ELASTIC MOUNTING WITH RIGIDITY BLOCKED IN ONE DIRECTION BY THE TENSION OF A CABLE EMBEDDED IN ELASTOMER

[75] Inventors: de Fontenay: Etienne, Decize; Patrick Parisot, Elancourt, both of France

[73] Assignee: S.A. dite: Caoutchouc Manufacture et Plastiques, Versailles, France

[21] Appl. No.: 162,746

[22] Filed: Mar. 1, 1988

[30] Foreign Application Priority Data

Oct. 28, 1987 [FR] France .................. 87 14897

[51] Int. Cl.[4] ............ B60G 13/02; B60G 11/22; F16F 7/00
[52] U.S. Cl. .................. 267/292; 267/136; 267/153; 267/140.5; 267/257
[58] Field of Search .......... 267/140.1, 136, 140.3, 267/140.5, 141, 141.1, 153, 137, 141.3, 293, 292, 294, 257, 258, 163, 201, 35, 281, 280, 140, 151, 152; 248/557, 562, 536; 296/35.3, 35.1

[56] References Cited

FOREIGN PATENT DOCUMENTS

| 0213043 | 3/1987 | European Pat. Off. ............ 267/153 |
| 1103773 | 3/1961 | Fed. Rep. of Germany . |
| 898055 | 4/1945 | France . |
| 2340834 | 9/1977 | France . |
| 2509000 | 1/1983 | France . |
| 8008049 | 11/1984 | France . |
| 2587072 | 3/1987 | France .............................. 267/136 |
| 0601861 | 2/1960 | Italy .................................. 267/141 |
| 0031608 | 3/1981 | Japan ................................ 267/153 |
| 0112320 | 9/1981 | Japan .............................. 267/140.1 |
| 0093533 | 5/1984 | Japan .............................. 267/140.5 |
| 0698953 | 10/1953 | United Kingdom ................. 267/35 |
| 901454 | 7/1962 | United Kingdom . |

Primary Examiner—Andres Kashnikow
Assistant Examiner—Mark T. Le
Attorney, Agent, or Firm—Thomas N. Ljungman

[57] ABSTRACT

An elastic mounting molded from an elastomer compound bonded to two fastening frames, in particular for antivibration isolation of vehicle suspension elements, where the deformation rigidity is blocked in one direction by the tension of a metal cable embedded in the elastomer.

18 Claims, 1 Drawing Sheet

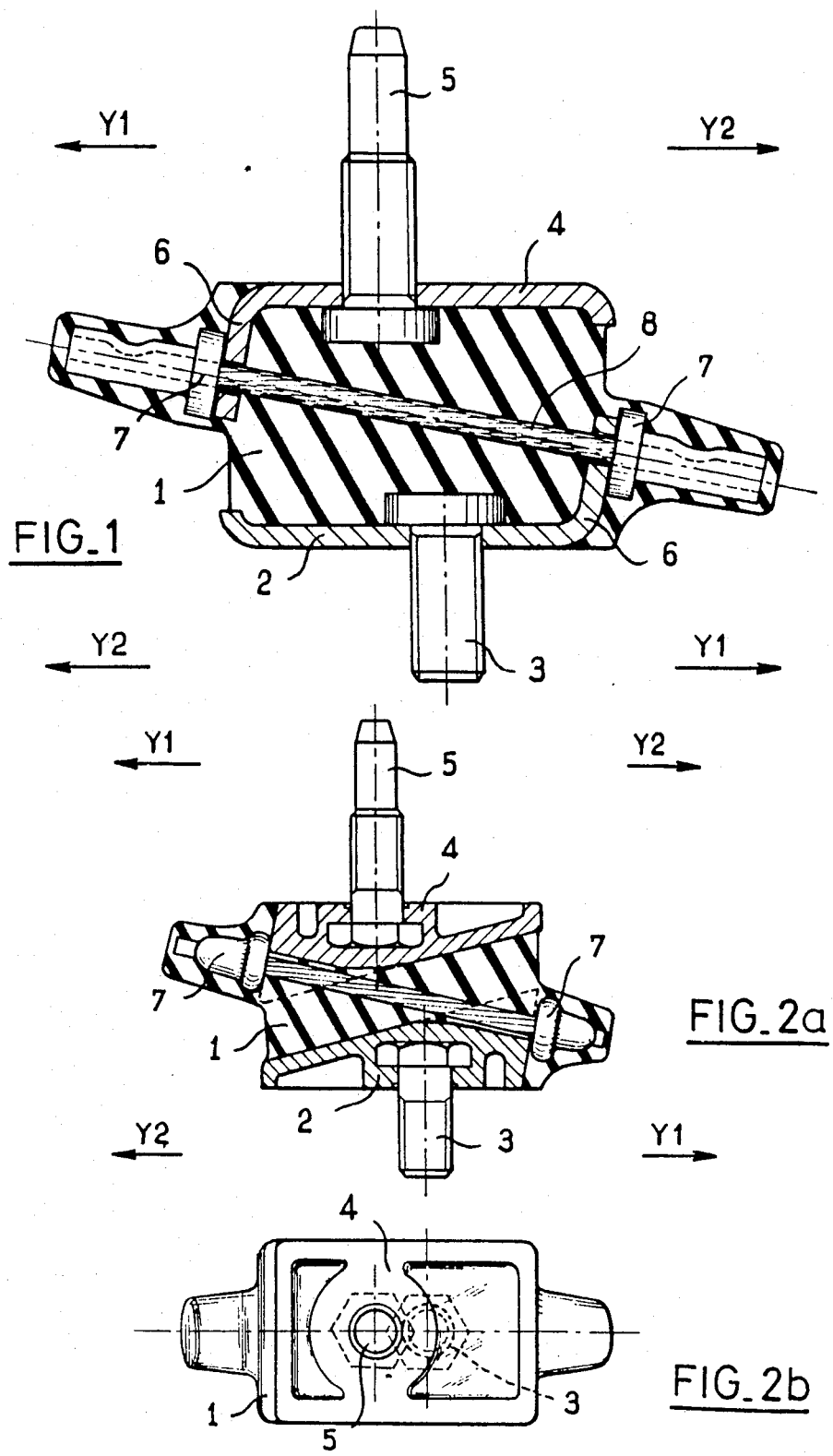

ELASTIC MOUNTING WITH RIGIDITY BLOCKED IN ONE DIRECTION BY THE TENSION OF A CABLE EMBEDDED IN ELASTOMER

BACKGROUND OF THE INVENTION

1. Field of the Invention:

This invention relates to the field of antivibration isolation devices, and in particular to the elastic parts used for this purpose in automotive vehicles, and in which a great static and dynamic flexibility of these elastic connections comes into conflict with the permanent or temporary forces exerted. In particular the forces between the chassis and the steering elements of the suspension or the connection to the ground.

2. Description of the Prior Art:

A first family of devices, currently used to solve this problem, filters vibrations in the median position by means of rubber blocks which are connected on one side to the chassis, or at least pressed against the fastening frames, and on the other side to the assembly to be isolated, such as a cross member of the frame supporting the rear axle of the vehicle. Extreme forces, or forces which exceed a certain value, are transmitted by contact between the lateral walls, which are normally free to move, and a rigid casing, generally made of metal, enclosing the deformable part, and thereby serving as a limit stop. The progressive nature of this contact regulates the transition from the zone in which a great deal of filtering takes place, before deformation, to the zone which is necessarily ten to fifty times more rigid, when forces are exerted, e.g. longitudinal forces during braking, or transverse forces during lateral steering. The objective is not to exceed several millimeters between the two positions, so as not to introduce instability in the steering of the vehicle. An example would be a rigidity of 15 or 25 daN per mm, and stop forces reaching 250 or 300 daN, without prohibitive travel. The principle of these applications is described in French Pat. No. 898.055 assigned to Getefo.

A second family of devices is used, in particular as an anti-torque strut of a drive unit, by connecting the body of a strut, which is bonded to or surrounded by an elastomer block forming an elastic articulation around a rod, but enclosing voids or cells within this block. When moderate forces, e.g., motor torque, are exerted, the form factor, i.e., the ratio of the free surface of the elastomer to its blocked surface on each rigid frame allows high deformability with low rigidity. On the other hand, once the cells are closed by flattening the free surfaces in the enclosing voids or cells within this block, high rigidity is obtained by means of the elastic layers which are effectively enclosed, thereby taking advantage of the fact that the rubber is practically, virtually, volumetrically incompressible.

One example of this mounting is described in the General Motors Corporation French Patent No. 2,453,746.

A third means of achieving high rigidity in a single privileged or preferred direction is to block the deformity by means of a rigid support in this direction. This means has the disadvantage of limiting the antivibration filtering, in particular, at least in this direction.

British Pat. No. 901,454 to H. D. Munson describes such solid stops, in contact with the fastening plates of a rubber sandwich. Lateral movement is permitted by spherical stops which rotate on their supports. Of course, when large forces are exerted, the elastic filtering is short circuited, in particular, by the two solid contacts. In spite of the fact that the support surface is restricted, it has virtually the rigidity of metal in the direction of compression.

All of the above-cited patents are incorporated herein by reference as if the entire contents thereof were fully set forth herein.

OBJECTS OF THE INVENTION

The object of the present invention, under conditions analogous to those of the apparatus described immediately above, is to make possible a high degree of anisotropy of rigidity, with antivibration filtering using the principle of a rubber sandwich bonded to metal plates, in itself part of the prior art, and blocking in a single direction by a new means comprising a cable under tension and embedded in elastomer. A technician skilled in the rubber industry which uses metal cables bonded to rubber by an appropriate chemical or electrolytic process such as brass plating of the steel wires comprising the strands, will certainly be aware of the difference of rigidity between a bare metal cable, where the tension rapidly blocks the helically wound turns of an element with the modulus of elasticity of steel, and the same cable throughly impregnated to the core with rubber. The layer of infiltrated rubber preventing contact between the metal wires which also, in alternating bending fatigue tests, delays the appearance of "fretting corrosion", is subjected to stress as soon as tension is applied to the cable, and as a result of the multiplicity of layers. An embodiment of the present invention constitutes an antivibration filter with great rigidity because of form factors being present without any free surface, and results in an apparatus which is much more efficient than a bare cable simply subjected to tension.

Another object of the invention is therefore to provide an elastic mounting, in particular one which can be used for the antivibration mounting of suspension elements on an automotive vehicle chassis, and is characterized by the fact that the free deformation rigidity of the elastomer is blocked in a single direction by the tension of a metal cable embedded in elastomer and firmly attached, by terminals, to each fastening frame.

SUMMARY OF THE INVENTION

One aspect of an embodiment of the invention relates to an elastic mounting comprising a vulcanized elastomer compound, bonded to two fastening frames, usable in particular for the antivibration isolation of suspension elements on an automotive vehicle chassis, wherein the free deformation rigidity of the elastomer compound is blocked in one direction by the tension of a metal cable embedded in the elastomer compound and linked by terminals to each fastening frame.

Another aspect of an embodiment of the invention resides broadly in an elastic mounting wherein the terminals of the metal cable are made by crimping a tubular terminal surrounding the end of the metal cable.

Yet another aspect of yet another embodiment of the invention resides broadly in an elastic mounting wherein the terminals of the metal cable are made by molding a ZAMAK alloy on the cut end of the metal cable.

Still yet another aspect of yet another embodiment of the invention resides broadly in an elastic mounting comprising: two rigid elements; a fastening arrangement for attaching each of the rigid elements; an arrangement, having a first strength in tension in a first direction and a second substantially lower strength in compression along at least one other direction, connecting the two rigid elements for restraining movement of the rigid elements in substantially at least the first direction; and an elastomeric material being disposed at least about the arrangement having a first strength in tension in a first direction and a second substantially lower strength in compression along at least one other direction.

Still yet a further aspect of yet another embodiment of the invention resides broadly in an elastic mounting comprising: two rigid elements; a fastening arrangement for attaching each of the rigid elements; a cable connecting the two rigid elements for restraining movement of the rigid elements in substantially at least one direction along a strength in tension of the cable; and an elastomeric material being disposed at least about the cable.

Yet still a further aspect of yet another embodiment of the invention resides broadly in an elastic mounting comprising: two rigid elements; a fastening arrangement for attaching each of the rigid elements; a cable connecting the two rigid elements for restraining movement of the rigid elements in substantially at least one direction; and an elastomeric material being disposed at least about the cable.

The invention and its variants are explained in greater detail in the following description, with reference to the accompanying figures.

BRIEF DESCRIPTION OF THE DRAWINGS

FIG. 1 is an axial section of one configuration of an elastic mounting according to the invention;

FIG. 2(a) is a variant of the same apparatus; and

FIG. 2(b) shows a top view of the apparatus in FIG. 2(a)

DESCRIPTION OF THE PREFERRED EMBODIMENTS

FIG. 1 is an axial section of an elastic mounting according to the invention. In the application illustrated in FIG. 1, illustrating the support of the cross member of the frame holding the rear axle of an automobile, the plane of the cross section is traverse to the vehicle, and the tension of the cable bears the lateral steering forces exerted by the wheels.

A permanent compression load is exerted on the rubber parallelopiped block 1 made of an elastomer compound with high dynamic characteristics, and preferably with low hardness.

An intimate bonding, during vulcanization, to the flat frames ensures a form factor such that the rigidity exceeds 75 or 80 daN per millimeter in pure compression, for the example shown, in spite of lateral deformabilities, in the order of magnitude of 15 daN/mm.

The lower frame 2, in which a screw or bolt 3 is incorporated, provides the fastening to the rear cross member of the frame, to which longitudinal suspension arms are affixed. The upper frame 4, which incorporates a screw or bolt 5, is used for fastening to the rear chassis, which is most often a self-supporting, integral welded body. Since the suspension springs generally have a lever arm which is shorter than that of the hub fastening, a permanent compression reaction moves the frames 2 and 4 somewhat closer together. The braking torque exerted by the suspension arms acts to increase this force. The longitudinal strain resulting from the braking is balanced by the fact that the part is mounted at a slight inclination. On each frame, there are identical brackets 6 pierced by a hole, to hold the stop on a terminal 7, crimped onto each end of a length of a metal cable 8.

In the absence of traverse forces in the direction Y1, and when no tension is applied, the cable allows substantially all the relative vibrational movements between the frames 2 and 4, with the elastic return resulting from and being provided by the action of the elastomer block 1.

In the presence of transverse forces on the bolt 5 and the upper frame in the direction of Y1, the cable is placed under tension. The cable assembly comes into contact by means of the terminals 7 with the seat disposed on the bracket 6, across the thin rubber cell in which both the cable assembly and the bracket 6 are embedded.

Sufficient filtering is ensured by the transversal of these elastomer layers and the non-rectilinear character of the cable stands, whose vibratory deformation produces multiple-interface contact between steel and low modulus elastomer compound, blocked by its volumetric incompressibilty, but with a transmission velocity much different from that of steel.

In the case of opposite stresses on the bolt 5 and the upper frame 4, in direction Y2, recalling that the major portion of the transversal force passes through the symmetrical device, the cable is relaxed, and the thin layers significantly reduce their apparent rigidity in the zone near zero stress, but without transitioning to the rigidity of traction, because the deformation is limited by the blocking exerted by the device. In case of deformation perpendicular to the direction of the cable, longitudinally in the vehicle, the rotation of the cable embedded in the rubber takes place without disturbing the shearing rigidity of the block 1 before the deformation has reached several millimeters.

FIGS. 2 (a) and 2 (b) show a variant of the apparatus where the frames 2 and 4 are made of an aluminum alloy casting, and where the operation of the device is substantially identical to the description of FIG. 1. The crimping of the terminals 7 on these two ends can be carried out either by crushing a tubular terminal, or by molding with a "ZAMAK" alloy using the principle of a bicycle brake cable, without modifying the operation of the apparatus. "ZAMAK" is a registered trademark for a diecasting zinc alloy which contains zinc, aluminum, magnesium and copper. The air included between the strands of the metal cable 8 is expelled, during the introduction of the elastomer composition, under high pressure, into the mold, through the passages, regardless of how crushed they may be, located in the two terminals 7 and exits the mold by means of outgrowths surrounding said terminals, to ensure the best possible bonding of the rubber with the cable, and weatherproofing, since the piece is particularly exposed, being positioned in a rear axle assembly.

In summary, an apparently very simply shaped piece, almost a parallelopiped, and with an elementary fastening which can easily be automated, performs the function previously performed by several surfaces, whose interstices are particularly susceptible to local accumulations of dust and oxidation. The entire assembly is lightweight, and when installed in a vehicle, allows a more precise control of the geometry of a rear axle thereof, for example.

The invention as described hereinabove in the context of a preferred embodiment is not to be taken as limited to all of the provided details thereof, since the modifications and variations thereof may be made without departing from the spirit and scope of the invention.

What is claimed is:

1. An elastic mounting comprising:
   two rigid elements;
   fastening means for attaching each of said rigid elements;
   connecting means, having a first strength in tension in a first direction and a second substantially lower strength in compression along at least one other direction, connecting said two rigid elements for restraining movement of said rigid elements in substantially at least said first direction;
   elastomeric material means being disposed at least about said connecting means;
   said connecting means being held in a substantially unrelaxed position by said elastomeric material means as substantially zero external forces are applied to the elastic mounting;
   said connecting means being substantially relaxed along said at least one other direction as said two rigid elements move toward compression of said connecting means; and
   said connecting means being in tension in said first direction as said two rigid elements move in said first direction to produce said tension on said connecting means.

2. An elastic mounting comprising:
   two rigid elements;
   fastening means for attaching each of said rigid elements;
   cable means connecting said two rigid elements for restraining movement of said rigid elements in substantially at least one direction along a strength in tension of said cable means;
   elastomeric material means being disposed at least about said cable means;
   said cable means being held in substantially unrelaxed position by said elastomeric material means as substantially zero external forces are applied to the elastic mounting;
   said cable means being substantially relaxed as said two rigid elements move toward compression of said cable means; and
   said cable means being in tension in said at least one direction as said two rigid elements move in said at least one direction to produce said tension on said cable means.

3. The elastic mounting according to claim 2, wherein said cable said means include terminals for connecting said cable means to said rigid elements.

4. The elastic mounting according to claim 3, wherein said said cable means have ends, and said terminals comprise tubular terminals crimped on and surrounding the ends of said cable means.

5. The elastic mounting according to claim 3, wherein said said cable means have cut ends, said terminals being molded on said cable means by molding a ZAMAK alloy on the cut ends of said cable means.

6. The elastic mounting according to claim 2, wherein said rigid elements comprise metal elements each having a first substantially straight portion facing the corresponding first portion of the other of the two rigid elements and each rigid element having a second portion being disposed at an angle to each said first portion, said cable means being connected between each second portion.

7. The elastic mounting according to claim 6, wherein said fastening elements are attached each to its corresponding first straight portion of said rigid elements and extend substantially at right angles from each said first portion.

8. The elastic mounting according to claim 7, wherein said elastomeric material means is also disposed between said rigid elements.

9. An elastic mounting comprising:
   two rigid elements;
   fastening means for attaching each of said rigid elements;
   cable means connecting said two rigid elements for restraining movement of said rigid elements in substantially at least one direction;
   elastomeric material means being disposed at least about said cable means;
   said cable means being held in a substantially unrelaxed position by said elastomeric material means as substantially zero external forces are applied to the elastic mounting;
   said cable means being substantially relaxed along at least one other direction which includes a direction being generally opposite to said at least one direction as said two rigid elements move in said at least one other direction; and
   said cable means being in tension in said at least one direction as said two rigid elements move in said at least one direction to produce said tension on said cable means.

10. The elastic mounting according to claim 9, wherein said mounting has a first direction of being restrained by said cable means and at least one other direction not being restrained by said cable means.

11. The elastic mounting according to claim 9, wherein said cable means are disposed for restraining said mount in only a single sense of the one direction.

12. The elastic mounting according to claim 9, wherein said fastening means are disposed in a second direction, said first direction being substantially at a right angle to said second direction.

13. The elastic mounting according to claim 9, wherein said cable means include terminals for connecting said cable means to said rigid elements.

14. The elastic mounting according to claim 13, wherein said cable means have ends, and said terminals comprise tubular terminals crimped on and surrounding the ends of said cable means.

15. The elastic mounting according to claim 13, wherein said cable means have cut ends, said terminals being molded on said cable means by molding a ZAMAK alloy on the ends of said cable means.

16. The elastic mounting according to claim 12, wherein said rigid elements comprise metal elements each having a first substantially straight portion facing the corresponding first portion of the other of the two rigid elements and each rigid element having a second portion being disposed at an angle to each said first portion, said cable means being connected between each second portion.

17. The elastic mounting according to claim 16, wherein said fastening elements are attached each to its corresponding first straight portion of said rigid elements and extend substantially at right angles from each said first portion.

18. The elastic mounting according to claim 17, wherein said elastomeric material means is also disposed between said rigid elements.

* * * * *